June 7, 1960 A. PROTZEN 2,940,032
INSTRUMENT LANDING SYSTEM
Filed Aug. 24, 1953 3 Sheets-Sheet 1
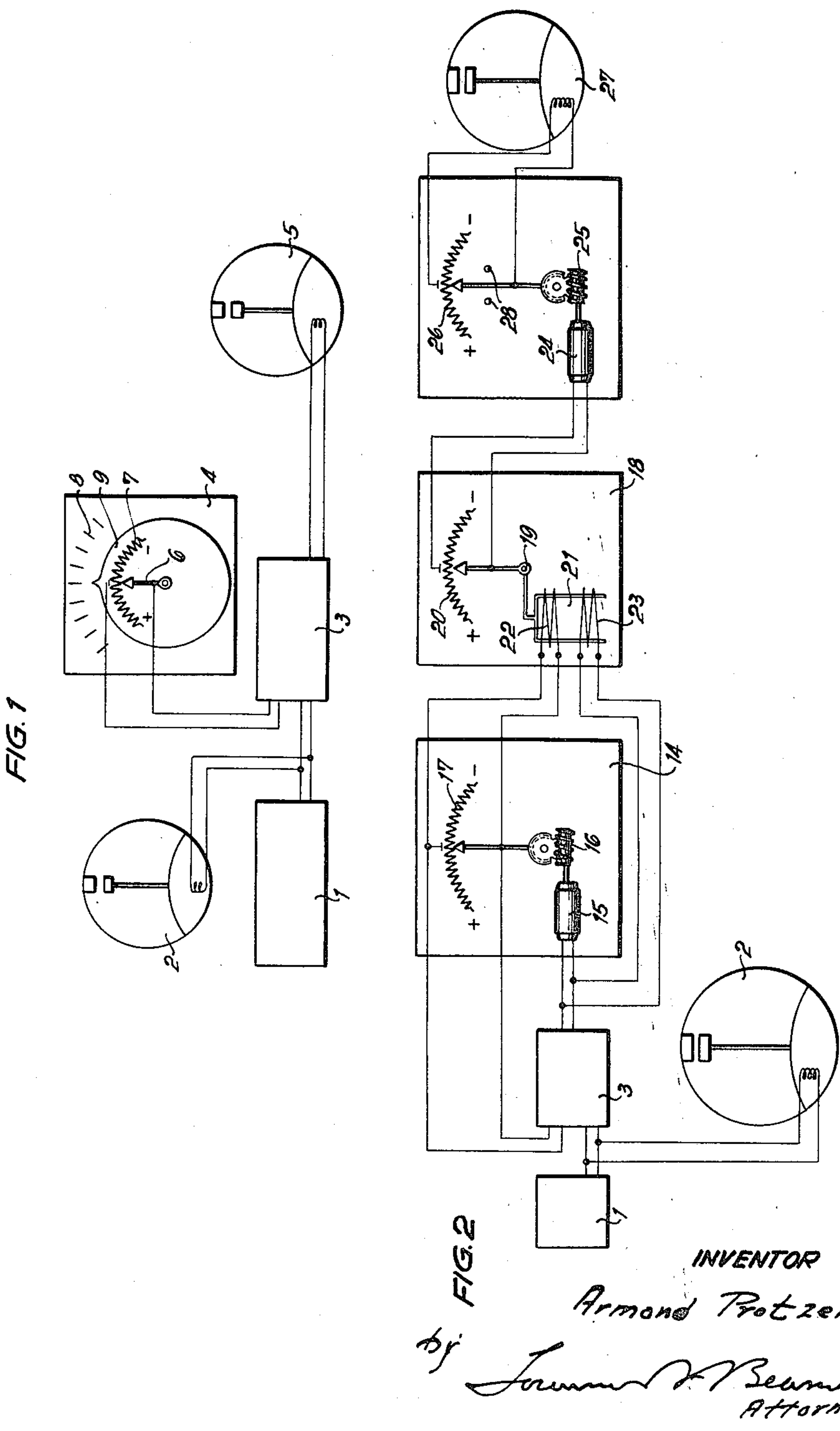

June 7, 1960 A. PROTZEN 2,940,032
INSTRUMENT LANDING SYSTEM
Filed Aug. 24, 1953 3 Sheets-Sheet 2
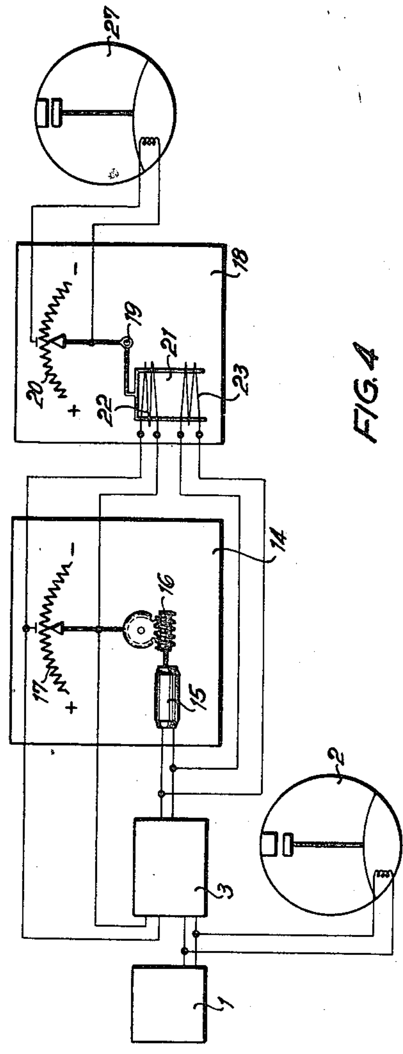
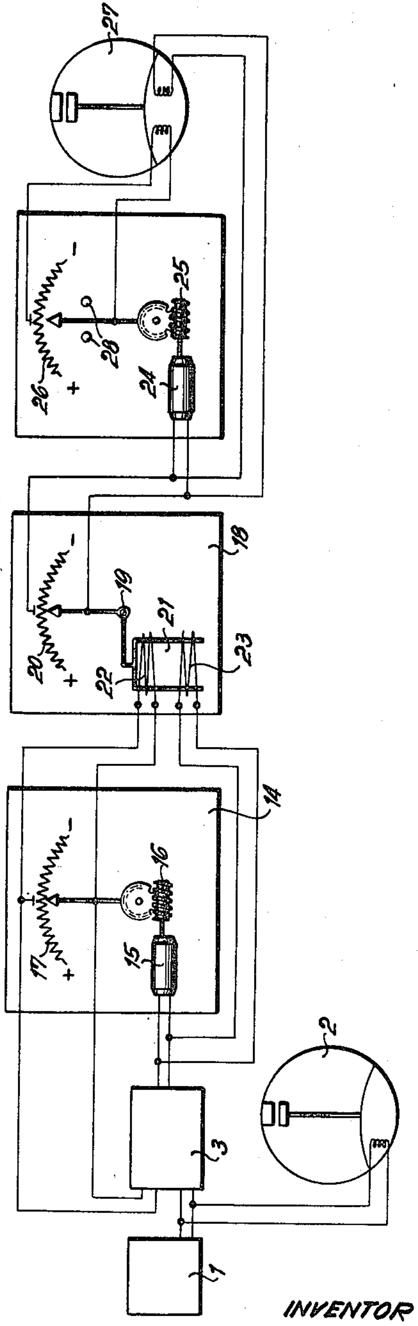
INVENTOR
Armand Protzen
by [signature]
Attorney June 7, 1960 A. PROTZEN 2,940,032
INSTRUMENT LANDING SYSTEM
Filed Aug. 24, 1953 3 Sheets-Sheet 3
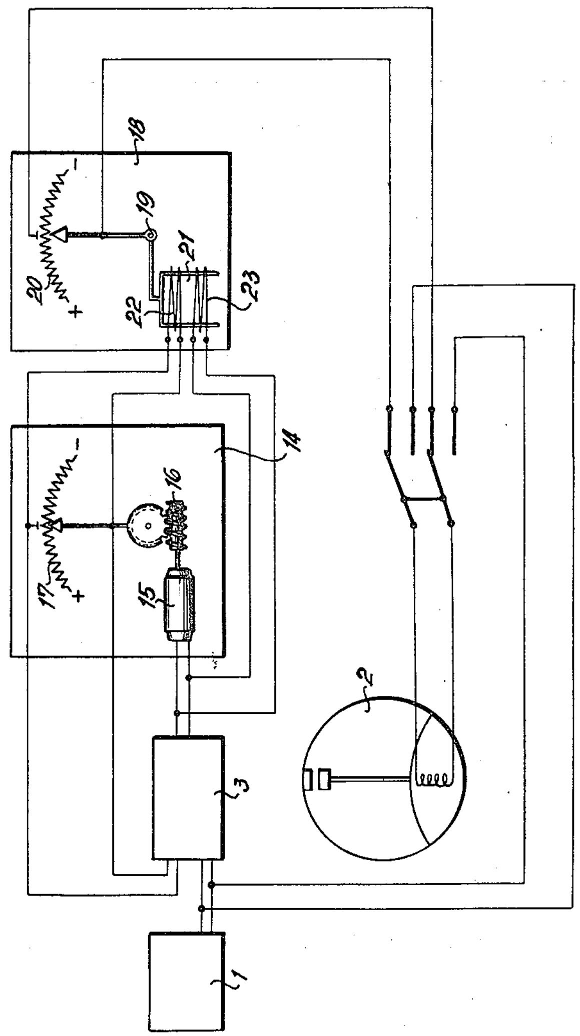
INVENTOR
Armond Protzen
by Lorimer [illegible] Beaman
Attorney United States Patent Office 2,940,032

Patented June 7, 1960

2,940,032

INSTRUMENT LANDING SYSTEM

Armand Protzen, Kirchheim-Teck, Germany, assignor to A. B. Wiesing, Advokatfirma Lagerlof, Stockholm, Sweden, a corporation of Sweden Filed Aug. 24, 1953, Ser. No. 376,208

Claims priority, application Germany Aug. 29, 1952

6 Claims. (Cl. 318—489)

The invention relates to a method and an apparatus for deriving a control effect whereby a vehicle, particularly an aircraft, may be guided on to an electrically propagated guiding beam in dependence upon the indication of an instrument which is responsive to the deviation from the guiding beam. It is to be understood that a control effect according to the invention may be used for guiding a vehicle in any direction and not only the course thereof in the horizontal plane. Since the invention is especially applicable to aircraft, the following description will refer, for purposes of illustration, only to aircraft.

However, it will be apparent to one skilled in the art, that the invention is applicable to the guiding of vehicles in general.

Flight navigations devices, such as airway beacons and landing beacons, have been known for a long time, by means of which the pilot is enabled to identify the position of the aircraft in relation to a prescribed path. Whilst the airway beacon is employed for overland navigation, the landing beacon is employed for approach and landing. Both types of beacons are adapted for horizontal navigation, whilst vertical navigation is carried out essentially only with the landing beacon. Vertical navigation is of importance in the final phase of the landing approach.

In this type of operations the pilot obtains on an instrument a continuous indication of the distance of the aircraft from the "Vertical reference plane" formed by the guiding beam generated by the beacon.

For example, in the approach, the pilot has to guide the aircraft on to a vertical reference plane bisecting the runway, as well as on to a plane through the desired landing point and corresponding to the prescribed glide path. In general, it is not the distance referred to, but some other effect representing the deviation of the vehicle from the guiding beam, such as an effect representing the angle between the guiding beam and a line joining the aircraft to the transmitter that is used to represent the distance. For simplicity, in the following description of various embodiments of the invention reference will be made to the deviation.

It is a simple matter for the pilot to determine from the instrument referred to above whether he is flying exactly on the beam or not. On the other hand, it is very difficult for him to correct precisely for the existing deviations. It is to be remembered that the pilot must make his corrections under blind flying conditions, when unknown factors, such as changing wind conditions and unavoidable irregularities or "bends" in the guiding beam are present.

Attempts have therefore been made to replace the indication of the deviation by an indication, such as a null indication, which would be easier for the pilot to interpret. Such devices allow the aircraft to be automatically guided on to the guiding beam if the pilot merely makes corrections so as to reduce an existing error to zero. Flying on the beam is thereby effected without any mental effort on the part of the pilot. On the basis of the reading of the null indicator the pilot needs only to carry out simple course or inclination corrections in the usual way.

In order to facilitate the understanding of the present invention, the basic construction of such a device for use with a normal blind landing system (for example an I.L.S. system) will now be described with reference to Fig. 1 of the drawings.

In the drawings:

Fig. 1 represents a block diagram of a prior apparatus,

Fig. 2 is a schematic diagram of an arrangement according to the invention utilizing an integrated control effect, Fig. 3 is a schematic diagram of a similar arrangement without integration, Fig. 4 is a schematic diagram of a device similar to that of Fig. 2 in which the control effect can be combined with its integral, Fig. 5 is a circuit diagram of an arrangement similar to that of Fig. 3, in which a single null indicator may have selectively applied thereto the deviation effect or the control effect.

Identical or similar components in the various figures are indicated by the same reference numerals.

In Fig. 1, an indicating instrument 2 indicates to the pilot in the usual manner the deviation determined by a receiver 1. It is assumed that the guide beam is vertical, so that the corrections apply to the course in the strict sense. The receiver output is applied not only to the indicating instrument but also to a combining amplifier 3, in which it is combined with a voltage derived from a course responsive device 4. The combined amplifier output is then applied to a null indicator 5. The null-indicator 5 consists in general of a sensitive moving-coil instrument. The course-responsive device comprises a course-indicating pointer 6, which is actuated usually by a master compass (not shown in the drawing), as well as a course adjuster 7, which is manually adjusted by the pilot in accordance with the known I.L.S. course upon a fixed course scale 8, the arrangement being such that the indicating pointer 6 taps off from a potentiometer 9, which is combined with the course adjuster 7, a voltage proportional to the difference between the actual course and the I.L.S. course to which the course adjuster is set. This deviation is then compared with the lateral deviation value in the combining amplifier 3.

If the aircraft is now parallel to the set I.L.S. course the combining amplifier 3 receives only the deviation error from the receiver, whilst the output of the course-responsive device is zero. The null indicator 5 is therefore deflected until the pilot has changed his course to such an extent that the output voltage of the device 4 compensates for the deviation voltage received from the receiver 1. The aircraft has thus assumed a new course directed towards the guiding beam, whereby a reduction of the deviation is obtained. However, the course-responsive voltage now dominates the combining amplifier 3 and makes it necessary for the pilot to reduce the angle of the course with respect to the guiding beam in order to return the null indicator again to zero. This process is repeated until the aircraft has again reached the guiding beam along a substantially logarithmic curve. The deviation voltage and the course voltage are then both down to zero in the amplifier 3 and the aircraft thus flies true on the beam.

By means of the above-described method it is thus possible to guide the aircraft along a substantially logarithmic path, which approaches the guiding beam asymptotically and to hold this course, the pilot having only to make corrections according to the null indicator. Fundamentally, the process described above for horizontal orientation will be applied in a similar manner to orientation in the vertical plane. I that case, the course-responsive device 4 will be replaced by an inclination-responsive device (gyro horizon).

Various modifications of the described arrangement are known but do not affect the principle of the method. For example, it is known in order to facilitate making corrections according to the null indicator 5 by applying to the combining amplifier 3 an additional effect derived from banking of the aircraft, this effect being derived from a gyro horizon.

Although the above process makes the blind approach and the staying on the guiding beam simpler, it is attended by certain drawbacks. Unavoidable errors in the aircraft compass installation may cause erroneous setting of the course-responsive device 4 and this may give rise to a constant course error in the approach. The effect of side wind will also have similar results. The error due to side wind may be avoided by suitable adjustment of the course-responsive device 4, but this presupposes extended observation and no variation of the side wind component. Since however, due to the constantly changing altitude, a change of wind must also be accounted for, these corrections are more or less illusory. Owing to these drawbacks it may be impossible under unfavourable conditions to make the approach with the desired degree of accuracy, so that the method often leads to unsuccessful approaches on narrow runways.

It is an object of the invention to provide a method and an apparatus for deriving a control effect for guiding a vehicle on to a guiding beam, which will avoid the drawbacks of prior methods and arrangements.

A specific object of the invention is to provide a method and an apparatus that will be independent of errors in the course setting and/or side wind fluctuations.

A further object of the invention is to reduce the influence of irregularities or "bends" in the guiding beam.

According to the invention the first derivative with respect to time is derived from the deviation value and is compared with the deviation itself. In this manner the guiding of the aircraft on to the guiding beam is made completely independent of the course, so that the associated errors, in particular that due to deviation errors of the gyro-compass, are completely avoided. In addition the influence of side wind fluctuations, which are in effect equivalent with a course error, is also automatically compensated for in this manner without the pilot having to concern himself with it. The required course correction is automatically produced and adjusted without even coming to the knowledge of the pilot.

Preferably, an effect representing the second derivative of the deviation with respect to time is introduced into the comparison. This second derivative is very closely approximated by the turning speed of the aircraft about an axis normal to the plane of travel. Whilst therefore the first derivative is derived from the deviation, the second derivative is preferably measured directly. If the aircraft is then guided by means of the null indicator in such a way that the control effect formed by the sum of the three values, that is to say of the deviation and of the first and second derivatives thereof, is always zero, then the aircraft is guided on to the beam along a logarithmic curve asymptotic to the beam.

The use of the gyro apparatus for introducing into the comparison the directly measured second derivative increases the accuracy of the method.

Further improvements and preferred embodiments of the invention will now be described with reference to Figures 2 to 5 of the accompanying drawings.

In the embodiment represented in Fig. 2, 1 represents the I.L.S. receiver, the output of which represents the deviation, and 2 represents the conventional indicating device. Besides being applied to the indicator 2, the output of the receiver 1 is also applied to an input circuit of an amplifier 3. The amplifier output drives an electric-motor 15 which is comprised in a course-responsive device 14. The speed of the motor 15 is proportional to the output voltage of the amplifier, and the motor actuates a sliding contact through a gear 16, which sliding contact taps off a proportional voltage on a potentiometer 17. This voltage is applied to a second input of the amplifier 3, the arrangement being such that the voltage tapped from the potentiometer by the sliding contact is always proportional to the deviation effect produced by the receiver.

If this deviation effect varies, the sliding contact moves at a rate proportional to the rate of variation of the deviation effect. This means that the output voltage of the amplifier 3 which is applied to the motor 15 is proportional to the lateral speed of the aircraft, or, what amounts to the same thing, proportional to the first derivative of the deviation.

A gyro apparatus 18 of known construction, which in the described example is a turn indicator, measures the turning speed or angular velocity of the aircraft about the vertical axis. The precession axis 19 of the captive gyro, not shown in Fig. 3, carries a movable tap which taps off on the potentiometer 20 a voltage proportional to the turning speed. This turning speed very closely approximates the lateral acceleration of the aircraft, that is, the required second derivative of the deviation. In the gyro apparatus 18 the precession moment of the gyro is compared with the moment produced by an electrical moment generator 21, which is shown in the present example in the form of a movable coil. For this purpose, the precession axle of the gyro apparatus is operatively connected with the armature of an electromagnet. The derivative effect or voltage measured at the potentiometer 17 and the deviation delivered to the motor from the output of the amplifier are applied to the windings 22 and 23 of the movable coil and there produce moments, which are compared directly with the precession moment of the gyro, that is to say with the second derivative. The voltage tapped off on the potentiometer 20 is therefore proportional to the sum of the deviation voltage and the first and second derivatives. The control effect thus derived is applied to an integrating motor 24, which in turn takes off a voltage on a potentiometer 26 by means of a slider operated through a gear 25. This voltage, which thus represents the integrated control effect, is then applied to the moving-coil instrument forming the null indicator 27 and is there indicated.

In the modified embodiment according to Fig. 3, the final integration of the control effect is dispensed with and the control effect is applied directly to the null indicator.

If the pilot maintains the null indicator in the zero position by suitable operation of the flight trimming controls, the sum of the deviation effect and of the first and second derivatives is always zero and the condition for an asymptotic approach to the guiding beam is fulfilled. The deflections of the null indicator represent, in the case of Fig. 2, course errors or, in the case of Fig. 3, turning speed errors and consequently can be compensated for easily by the pilot with the aid of familiar techniques. In the case of Fig. 3 this means that flight according to the null indicator corresponds exactly to flight according to a turn indicator, with which every pilot is familiar.

The integration of the control effect has the advantage that a very steady indication is obtained. By providing stops 28 for the slider the indicated course error can be limited at a chosen threshold level. This has the advantage that at the beginning of the approach no extensive course changes need to be effected in order to bring the indicator to zero.

In the Fig. 4 embodiment, the null indicator 27 provides a combined indication of the turning speed error derived by the gyro apparatus 18 and the course error derived by the integrating motor 24. In addition, an adjustable potentiometer may be provided in the integrating circuit for varying the combining ratio. The combination of the course error and the turning speed error makes it much simpler for the pilot to guide the aircraft than if only the course error indication is employed. By means of this combining process the best compromise can be obtained between guiding accuracy and indicator stability.

The Fig. 5 embodiment differs from that of Fig. 3 in that the second null indicator 27 is omitted, the first null indicator 2 being selectively connectable to the gyro device 18 or to the receiver.

It has been mentioned above that in prior methods an effect representative of the banking position was employed for facilitating the guiding operation. This effect may be produced in a simple manner by the present apparatus by tilting the gyro device 18 in such a manner that the gyro, besides measuring the turning speed of the aircraft about the vertical axis, also measures a turning speed component about the aircraft longitudinal axis the effect thus obtained being, of course, proportional to the inclination at which the gyro is set. By varying this inclination the responsiveness of the gyro to banking can therefore be adjusted as required. The measured banking rate effect is integrated by the integrating device and is applied to the null indicator as a banking position effect.

What I claim is:

1. In an apparatus for deriving a control effect for guiding a vehicle onto an electrically propagated guiding beam, a measuring instrument for deriving a first effect representing the deviation of the vehicle from the guiding beam, means for deriving the first derivative of said effect with respect to time, gyro means responsive to the turning speed of the vehicle about an axis normal to the plane of travel thereof for deriving the second derivative of said effect with respect to time and means for comparing the said derivatives with the said effect to derive a control effect.

2. In an apparatus for deriving a control effect for guiding a vehicle on to an electrically propagated guiding beam, a measuring instrument for deriving an effect representing the deviation of the vehicle from the guiding beam, means for deriving the first derivative of said effect with respect to time, gyro means responsive to the turning speed of the vehicle about an axis normal to the plane of travel thereof for deriving the second derivative of said effect with respect to time, means for comparing the said derivatives with the said effect to derive a control effect, an indicating instrument for giving an indication of the combined effect of said effect and said first and second derivatives of said effect.

3. Apparatus according to claim 1, for guiding a vehicle onto a vertical guiding beam, in which the said gyro means is adjustable so as to be made responsive to an adjustable degree to the turning of the vehicle about its longitudinal axis for deriving a second effect representing the turning speed of the vehicle about the said longitudinal axis, the said second effect being applied to a null indicator.

4. In an apparatus for deriving a control effect for guiding a vehicle on to an electrically propagated guiding beam, a measuring instrument for deriving an effect representing the deviation of the vehicle from the guiding beam, means for deriving the first derivative of said effect with respect to time, gyro means responsive to the turning speed of the vehicle about an axis normal to the plane of travel thereof for deriving the second derivative of said effect with respect to time, means for comparing the said derivatives with the said effect to derive a control effect, and an integrator having the said control effect applicable thereto for deriving therefrom the integrated value thereof.

5. Apparatus as claimed in claim 4, comprising an indicating instrument for indicating the said integrated value, said instrument having adjustable stops for limiting the value indicated thereby when the said integrated value surpasses a predetermined threshold level.

6. Apparatus as claimed in claim 4, comprising a null indicator to which the said control effect and the integrated value thereof is applicable in predetermined proportions.

References Cited in the file of this patent

UNITED STATES PATENTS

| | | |
|---|---|---|
| 1,703,280 | Minorsky | Feb. 26, 1929 |
| 1,958,258 | Alexanderson | May 8, 1934 |
| 2,259,600 | Alkan | Oct. 21, 1941 |
| 2,372,185 | Wittkuhns | Mar. 27, 1945 |
| 2,423,337 | Moseley | July 1, 1947 |
| 2,513,537 | Williams | July 4, 1950 |
| 2,548,278 | Wirkler | Apr. 10, 1951 |
| 2,613,350 | Kellogg | Oct. 7, 1952 |
| 2,613,352 | Kellogg | Oct. 7, 1952 |
| 2,644,941 | Kellogg | July 7, 1953 |
| 2,759,137 | Kutzler | Apr. 14, 1956 |

OTHER REFERENCES

Aero Digest, January 1949, pages 58, 59 and 87.